(12) United States Patent
Lee et al.

(10) Patent No.: US 8,287,411 B2
(45) Date of Patent: Oct. 16, 2012

(54) HYBRID TRANSMISSION WITH INTEGRATED TORQUE MACHINE

(75) Inventors: Chunhao J. Lee, Troy, MI (US); Farzad Samie, Franklin, MI (US); Norman K. Bucknor, Troy, MI (US); Kumaraswamy V. Hebbale, Troy, MI (US); Anthony L. Smith, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 716 days.

(21) Appl. No.: 12/404,397

(22) Filed: Mar. 16, 2009

(65) Prior Publication Data

US 2010/0234159 A1 Sep. 16, 2010

(51) Int. Cl.
*F16H 3/72* (2006.01)

(52) U.S. Cl. .................... 475/5; 180/65.21; 475/149

(58) Field of Classification Search .............. 475/5, 149; 180/65.21

See application file for complete search history.

(56) References Cited

U.S. PATENT DOCUMENTS

| | | | |
|---|---|---|---|
| 7,008,347 B2 | 3/2006 | Klemen | |
| 7,192,373 B2 | 3/2007 | Bucknor et al. | |
| 7,220,203 B2 | 5/2007 | Holmes | |
| 7,238,131 B2 | 7/2007 | Raghavan et al. | |
| 7,256,510 B2 | 8/2007 | Holmes et al. | |
| 7,264,071 B2 | 9/2007 | Schmidt et al. | |
| 7,278,941 B2 | 10/2007 | Holmes | |
| 7,338,401 B2 * | 3/2008 | Klemen et al. | 475/5 |
| 7,396,312 B2 | 7/2008 | Klemen et al. | |

* cited by examiner

*Primary Examiner* — Katy M Ebner

(57) ABSTRACT

A hybrid transmission device for a hybrid powertrain system having an integrated torque machine to transfer power among an input member, the torque machine and an output member in one of a plurality of fixed gear and continuously variable states is operative in a plurality of fixed gear states, a continuously variable state, and a torque machine state.

11 Claims, 10 Drawing Sheets

| Gear State | Gear Ratio | C2 CLUTCH Gnd S3 | C1 CLUTCH Input S3 | C3 CLUTCH Input PC3 | C4 CLUTCH Gnd S1 | | Engine 10 | Torque Machine 70 |
|---|---|---|---|---|---|---|---|---|
| REVT | Variable | | G | | | | | X |
| N | | | | | | | | |
| EVT | Variable | X | | | | | X | X |
| 2nd | 2.964 | | X | | X | | X | X |
| 3rd | 1.912 | | | X | X | | X | X |
| 4th | 1.446 | | X | X | X | | X | X |
| 5th | 1.000 | X | X | X | | | X | X |
| 6th | 0.746 | X | | X | | | X | X |
| EV | | X | X | | | | | X |

FIG. 2

| Gear State | Gear Ratio | C2 CLUTCH Gnd S3 | C1 CLUTCH Input S3 | C3 CLUTCH Input PC3 | C4 CLUTCH Gnd S1 | C5 CLUTCH Gnd PC3 | Engine 10 | Torque Machine 70 |
|---|---|---|---|---|---|---|---|---|
| REVT | Variable |   | X |   |   |   | X | X |
| Rev | -2.942 |   | X |   |   | X | X |   |
| N |   |   |   |   |   |   |   |   |
| EVT | Variable | X |   |   | X |   | X | X |
| 1st | 4.584 |   |   |   | X | X | X | X |
| 2nd | 2.964 |   |   | X | X |   | X | X |
| 3rd | 1.912 |   | X | X |   |   | X | X |
| 4th | 1.446 |   | X | X |   |   | X | X |
| 5th | 1.000 | X | X |   |   |   | X | X |
| 6th | 0.746 | X |   | X |   |   | X | X |
| EV |   | X | X |   |   |   |   | X |

FIG. 4

| Gear State | Gear Ratio | C2 CLUTCH Gnd S3 | C1 CLUTCH Input S3 | C3 CLUTCH Input PC3 | C4 CLUTCH Gnd S1 | SOWC CLUTCH Gnd PC3 | Engine 10 | Torque Machine 70 |
|---|---|---|---|---|---|---|---|---|
| REVT | Variable | | X | | | | | |
| Rev | -2.942 | | X | | | R | X | X |
| N | | | | | | | | |
| EVT | Variable | | | | X | F | X | X |
| 1st | 4.584 | X | | | X | | X | X |
| 2nd | 2.964 | | X | | X | | X | X |
| 3rd | 1.912 | | | X | X | | X | X |
| 4th | 1.446 | | | X | | | X | X |
| 5th | 1.000 | | X | X | | | X | X |
| 6th | 0.746 | X | X | | | | X | X |
| EV | | X | X | | | | | X |

FIG. 6

| Gear State | Gear Ratio | C2 CLUTCH Gnd S3 | C1 CLUTCH Input S3 | C3 CLUTCH Input PC3 | C4 CLUTCH Gnd S1 | SOWC CLUTCH Gnd PC3 | | Engine 10 | Torque Machine 70 |
|---|---|---|---|---|---|---|---|---|---|
| REVT | Variable | | X | | | | | | |
| Rev | -2.942 | | X | | | R | | X | X |
| N | | | | | | | | | |
| EVT | Variable | | | | X | F | | X | X |
| 1st | 4.584 | | | | X | | | X | |
| 2nd | 2.964 | X | | | X | | | X | X |
| 3rd | 1.912 | | X | X | | | | X | X |
| 4th | 1.446 | | | X | | | | X | X |
| 5th | 1.000 | X | | X | | | | X | X |
| 6th | 0.746 | X | | | | | | X | X |
| EV | | X | X | | | | | | X |

FIG. 8

| Gear State | Gear Ratio | Ratio Step | OWC Gnd PC3 | C2 CLUTCH Gnd PC3 | C1 CLUTCH Input S3 | C3 CLUTCH Input PC3 | C4 CLUTCH Gnd S1 | C5 CLUTCH Gnd PC3 | Engine 10 | Torque Machine 70 |
|---|---|---|---|---|---|---|---|---|---|---|
| Rev | -2.942 | | | | G | | | X | X | |
| N | | -0.64 | | | | | | | | |
| 1st | 4.584 | | X | | | | | | X | X |
| 2nd | 2.964 | 1.55 | | X | X | | G | C | X | X |
| 3rd | 1.912 | 1.55 | | | | X | X | | X | X |
| 4th | 1.446 | 1.32 | | | X | X | X | | X | X |
| 5th | 1.000 | 1.45 | | X | X | X | | | X | |
| 6th | 0.746 | 1.34 | | | | | | | X | |
| EV | | | | | | | X | | Lock-up | X |
| EVT | | | | | | | X | | X | X |

HYBRID TRANSMISSION WITH INTEGRATED TORQUE MACHINE

TECHNICAL FIELD

This disclosure pertains to power transmission devices, and more specifically hybrid powertrain transmission systems.

BACKGROUND

The statements in this section merely provide background information related to the present disclosure and may not constitute prior art.

Known hybrid powertrain architectures can include multiple torque-generative devices including internal combustion engines and non-combustion torque machine(s) that can transfer torque through an output member to a driveline through a power transmission device. A torque machine, e.g., an electric machine operative as a motor or a generator, can generate a torque input to the transmission independently of a torque input from the internal combustion engine. The torque machine may transform vehicle kinetic energy transferred through the driveline to energy that is storable in an energy storage device. A control system monitors various inputs from the vehicle and the operator and provides operational control of the hybrid powertrain, including controlling operating range and gear shifting, controlling the torque-generative devices, and regulating the power interchange among the energy storage device and the torque-generative devices to manage outputs of the transmission to the driveline, including torque and rotational speed.

Known transmission systems deliver mechanical power from the engine and torque machine(s) to the driveline system including fixed final drive gearing, axles and wheels. A known mechanical transmission allows some freedom in engine operation through selection of one of a plurality of fixed gear drive ratios, a neutral selection that allows the engine to operate when the vehicle is stopped, and clutches or a torque converter for smooth transitions between driving ratios and to launch the vehicle from rest. Transmission gear selection allows power from the engine to be delivered to the transmission and driveline with predetermined ratios of torque multiplication and speed reduction, overdrive, and a reverse direction.

A power-split hybrid transmission can use differential gearing to achieve a continuously variable torque and speed ratio between an input member and an output member to the driveline. The differential gearing transfers mechanical power to the torque machine and to the driveline. Known hybrid powertrain systems include a torque machine that provides torque input to a powertrain system at an input member or an output member of a transmission.

SUMMARY

A hybrid transmission device includes an input member coupled to a first element of an input differential gearset, the input differential gearset interconnected to a reactive differential gearset interconnected to an output differential gearset coupled to an output member of the transmission device. The transmission device further includes a torque machine including a rotor rotatably coupled to a first element of the input differential gearset and coupled to a second element of the reactive differential gearset. A first clutch device is configured to couple rotation of the input member to rotation of a first element of the reactive differential gearset when applied. A second clutch device is configured to ground rotation of the first element of the reactive differential gearset when applied. A third clutch device is configured to couple rotation of the input member to rotation of the second element of the reactive differential gearset when applied. A fourth clutch device is configured to ground rotation of an element of the output differential gearset when applied. And, a fifth clutch device is configured to ground the rotor of the torque machine and the first element of the input differential gearset when applied.

BRIEF DESCRIPTION OF THE DRAWINGS

One or more embodiments will now be described, by way of example, with reference to the accompanying drawings, in which:

FIGS. 2, 4, 6, and 8 are charts illustrating clutch engagements and torque machine operation of the exemplary hybrid powertrains of FIGS. 1, 3, 5, and 7 respectively, in accordance with the present disclosure.

FIG. 10 is a chart illustrating clutch engagements and torque machine operations of the exemplary hybrid powertrain depicted in FIG. 9 in accordance with the disclosure.

DETAILED DESCRIPTION

Figure 1:
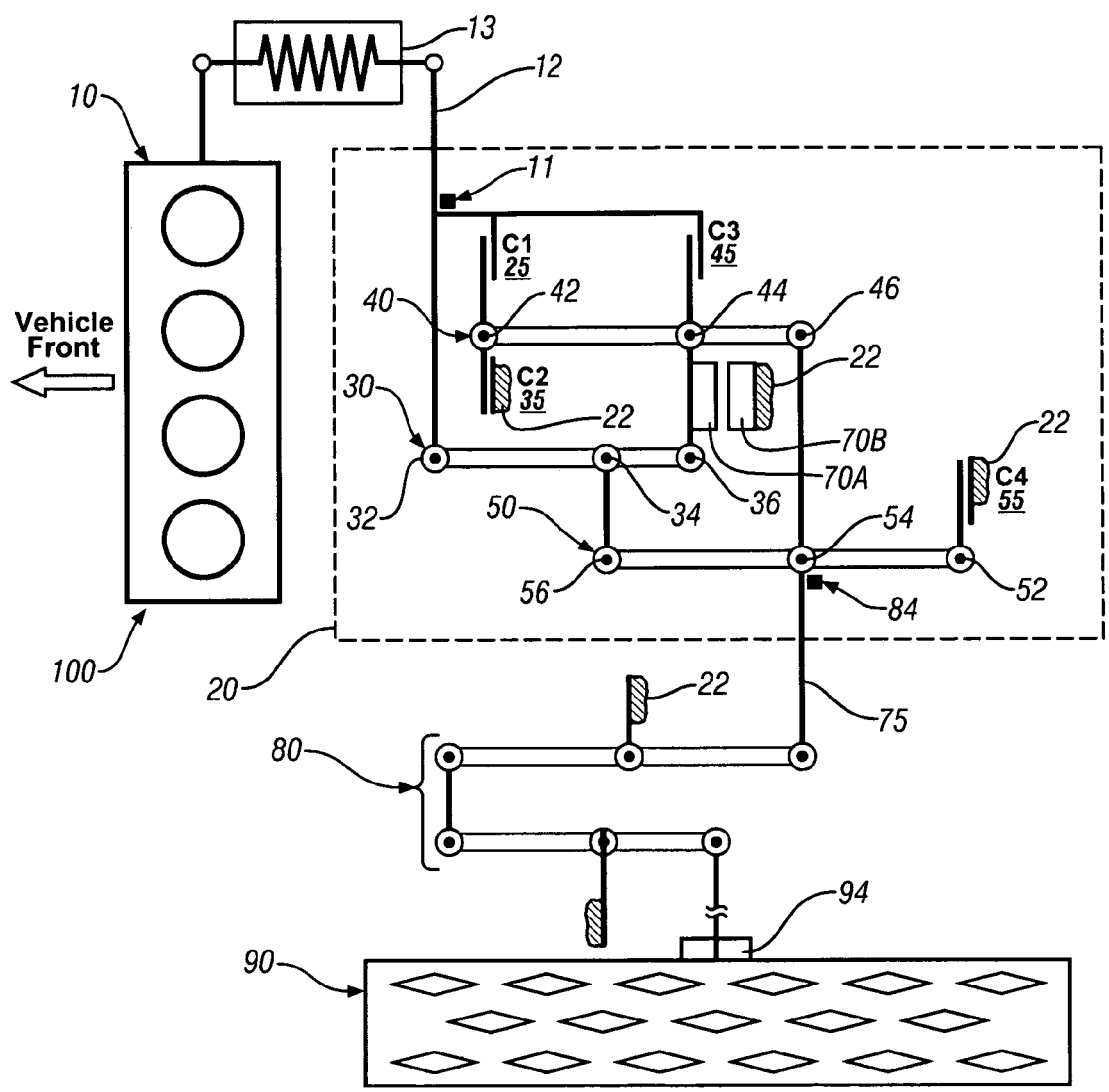
FIGS. 1, 3, 5, and 7 are schematic diagrams of exemplary hybrid powertrains, in accordance with the present disclosure.

The drawings described herein are for the purpose of illustrating certain exemplary embodiments only and not for the purpose of limiting the same, with like reference numerals representing like elements through the several figures. As used herein, the term 'coupled' comprises any coupling, including direct mechanical linkages, belt linkages, and other couplings that enable transfer of mechanical power between elements of the system. As used herein, the terms forward and reverse are used with reference to direction of vehicle travel.

FIG. 1 schematically shows an embodiment of a hybrid powertrain system 100, including an engine 10 coupled via an isolation device 13 to an input member 12 of a hybrid transmission 20 having an output member 75. The output member 75 is coupled via a driveline 80 to vehicle wheels 90 in one embodiment. The hybrid transmission 20 is preferably configured for operation with a front wheel drive vehicle, with the driveline 80 comprising a transaxle device. A transmission output speed sensor 84 monitors rotational speed and rotational direction of the output member 75. Each of the vehicle wheels 90 is preferably equipped with a sensor 94 adapted to monitor wheel speed, the output of which is monitored by a control module of a distributed control module system to determine vehicle speed, and absolute and relative wheel speeds for braking control, traction control, and vehicle acceleration management.

The exemplary engine 10 comprises a multi-cylinder internal combustion engine operative to transfer torque to the hybrid transmission 20 via the input member 12, and can be configured to generate power by igniting a fuel/air charge in a combustion chamber using spark-ignition, compression-ignition, and other charge-ignition methods. The engine 10 includes a crankshaft (not shown) coupled to the input member 12 of the hybrid transmission 20. A rotational speed sensor 11 monitors rotational speed of the input member 12. Power output from the engine 10, described in terms of rotational speed and engine torque, can differ from input speed and input torque to the hybrid transmission 20 due to placement of torque-consuming components on the input member 12 between the engine 10 and the hybrid transmission 20, e.g., the isolation device 13, a torque converter device 13═ including a torque converter clutch 85, and a hydraulic pump (not shown). Engine states preferably comprise one of an engine-on state (ON) and an engine-off state (OFF), with the engine-off state consisting of the crankshaft of the engine 10 not spinning. When the engine 10 is in the engine-on state (ON) state, i.e., with the engine 10 spinning, the engine 10 can be operating in either of a fueled state and a fuel-cutoff state.

The hybrid transmission 20 includes a single torque machine comprising a rotor 70A and a stator 70B that are integrated into a hardware structure, i.e., a case 22 of the hybrid transmission 20. The hybrid transmission 20 transfers mechanical power between the engine 10, the torque machine 70 and the output member 75 coupled to the driveline 80 in one embodiment. The engine 10 and the torque machine 70 are controllable to generate mechanical power that can be used as tractive torque through the hybrid transmission 20. The engine 10 and hybrid transmission 20 are controllable to generate mechanical power that can be transferred to the torque machine 70 to generate electrical power. The hybrid transmission 20 is controllable to transfer mechanical power in the form of reactive torque from the torque machine 70 to the output member 75 to the driveline 80 to generate electrical power through regenerative braking.

The hybrid transmission 20 includes a plurality of interconnected differential gearsets, comprising in one embodiment three planetary-gearsets 30, 40, and 50. Alternative gearsets can be used, e.g., bevel gears, in an arrangement where the rotational speed of at least one element of a gearset is always a weighted average of speeds of two other elements. The first planetary gearset 30, also referred to as an input gearset includes a sun gear member 32, a ring gear member 36, and a planet carrier assembly 34. The second planetary gearset 40, also referred to as a reaction gearset includes a sun gear member 42, a ring gear member 46, and a planet carrier assembly 44. The third planetary gearset 50, also referred to as an output gearset includes a sun gear member 52, a ring gear member 56, and a planet carrier assembly 54. The input member 12 is coaxial with and connects to the sun gear 32 of the first planetary gearset 30. The input member 12 is connectable to the sun gear 42 of the second planetary gearset 40 via application of clutch C1 25, and rotatably connectable to the planet carrier set 44 of the second planetary gearset 40 via application of clutch C3 45. The planet carrier set 44 of the second planetary gearset 40 is coaxial to and connects to the ring gear 36 of the first planetary gearset 30. The ring gear 56 of the third planetary gearset 50 is coaxial with and connects to the planet carrier set 34 of the first planetary gearset 30. The ring gear 46 of the second planetary gearset 40 is coaxial with and connects to the planet carrier set 54 of the third planetary gearset 50 and to the output member 75. The second sun gear 42 can be grounded to the case 22 by applying the second clutch C2 35. The third sun gear 52 can be grounded to the case 22 by applying the fourth clutch C4 55.

There are four torque transfer clutches C1 25, C2 35, C3 45, and C4 55 in one embodiment. As used herein, the term clutch refers to any type of torque transfer device and includes friction torque transfer devices and one-way clutch devices. The friction torque transfer devices comprise single or compound plate clutches or packs, band clutches, and brakes, for example. A hydraulic control circuit (not shown) preferably controlled by a transmission control module (not shown) is operative to control clutch states, i.e., applied or deactivated. In this embodiment, clutches C1 25 and C3 45 preferably comprise hydraulically-applied rotating friction clutches, and clutches C2 35 and C4 55 preferably comprise hydraulically-applied stationary devices that can be selectively grounded to the transmission case 22. Each of the clutches C1 25, C2 35, C3 45, and C4 55 is preferably individually hydraulically applied, selectively receiving pressurized hydraulic fluid via the hydraulic control circuit.

The hybrid transmission 20 is selectively operative in a plurality of operating states, including a torque machine state, a continuously variable state, and a plurality of fixed gear states each including a torque machine power assist mode. The torque machine power assist mode includes a motor-assisted fixed gear mode wherein tractive power is transferred to the driveline 80 from the engine 10 and the torque machine 70 through the hybrid transmission 20. The torque machine power assist mode includes an electric power generation fixed gear mode wherein power is transferred from the engine 10 to the hybrid transmission 20 to generate tractive power transferred to the driveline 80 in one of the fixed gear states and to generate electric charging power using the torque machine 70. The generated electric power can be used to charge the energy storage device.

The embodiment of FIG. 1 shows the fixed gear states including one of five forward fixed gears, wherein power is transferred between the input member 12, the torque machine 70 and the output member 75 at one of a five predetermined fixed gear ratios by selectively applying one or more of the clutches C1 25, C2 35, C3 45, and C4 55.

FIG. 2 shows exemplary operating states (Gear State) and associated gear ratios (Gear Ratio) for the hybrid transmission 20 and powertrain system 100 depicted in FIG. 1 in chart form. This includes operating in the torque machine state, the continuously variable state, and the plurality of fixed gear states including the torque machine power assist modes. The table of FIG. 2 depicts applied ones (X) of the clutches C1, C2, C3, and C4 to achieve specific transmission states including a continuously variable Reverse state (REVT), Neutral (N), the continuously variable state (EVT), each of the fixed gear states (2nd, 3rd, 4th, 5th, and 6th), and the torque machine state (EV) wherein the engine 10 is in the engine-off state. The fifth fixed gear state preferably has an input speed/output speed ratio of 1:1 between the input member 12 and the output member 75, and the sixth fixed gear state preferably has an input speed/output speed ratio of less than 1:1, i.e., an overdrive ratio, in the embodiment comprising 0.746:1. The hybrid transmission 20 is operative in the torque machine state (EV) wherein torque is transferred between the torque machine 70 and the output member 75 with the engine 10 in the engine-off state. The hybrid transmission 20 is operative in a regenerative power braking mode by operating the torque machine 70 in a power generating operating mode and operating the engine 10 in the engine-on state and the fuel-cutoff state, or by operating the engine 10 in the engine-off state. In this embodiment, vehicle launch is achieved by operating in the continuously variable state and eliminating a nominal first fixed gear state. The continuously variable state (EVT) includes operating the torque machine 70 and the engine 10 to generate power with a single applied clutch, e.g., C4 55 in the embodiment, to transfer torque and power through the hybrid transmission 20 to the driveline 80 to launch the vehicle or permit creep. The Reverse state is achieved by operating the torque machine 70 and the engine 10 to generate power with only clutch C1 25 applied.

When operating in one of the fixed gear states, the hybrid transmission 20 can operate using the torque machine power assist mode to generate tractive power or regenerative power. The fixed gear states each provides a fixed ratio operation of input-to-output speed of the hybrid transmission 20. The fixed ratio operation of input-to-output speed increases with increased fixed gear operation due to decreased gear ratios in the planetary gear sets 30, 40 and 50. The rotational speed of the torque machine 70 is dependent on internal rotations as defined by applied torque transfer clutches and is proportional to the input speed measured at the input member 12. When operating in one of the fixed gear states in the torque machine power assist mode, the input-to-output speed of the hybrid transmission 20 remains fixed and the power output of the hybrid transmission 20 through output member 75 is based upon the engine power and the torque machine power.

The torque machine 70 comprises an electric motor/generator in one embodiment. The electric motor/generator comprises a three-phase AC machine including rotor 70A and stator 70B. The motor stator 70B is grounded to an outer portion of the transmission case 22, and includes a stator core with coiled electrical windings extending therefrom. The rotor 70A for the torque machine 70 is supported on a hub plate gear that is coupled to the ring gear member 36 of the first planetary gearset 30. The torque machine 70 generates tractive power by discharging potential energy stored in an energy storage device (not shown), e.g., a high voltage electrical battery when the torque machine 70 comprises an electric machine. The torque machine 70 operates in the regenerative power braking mode by generating reactive torque that can react with driveline torque to transform vehicle kinetic energy to storable electric energy during a braking or coasting operation of the vehicle. Alternatively, the torque machine 70 can comprise a hydro-mechanical device that generates tractive torque using hydraulic pressure stored in an accumulator device, and transforms vehicle kinetic energy to storable hydraulic energy during a braking or coasting operation of the vehicle.

The hybrid transmission 20 operates in the torque machine state (EV) with the engine 10 in the engine-off state, i.e., not fueled and not spinning. The hybrid transmission 20 operates in the torque machine state by applying clutches C1 25 and C2 35. Clutches C1 25 and C2 35 are used to ground the input member 12 and stop the engine 10 from spinning. The torque machine 70 operates in an engine start mode to crank and start the engine 10, including during ongoing operation of the powertrain system by operating in the torque machine state with clutch C1 25 applied and with clutch C2 35 deactivated.

The hybrid transmission 20 operates in the continuously variable state (EVT) by applying clutch C4 55 with the engine 10 in the engine-on state, i.e., fueled and spinning. The hybrid transmission 20 transfers torque that is generated by the torque machine 70 and torque generated by the engine 10 to the output member 75 by applying clutch C4 55. The nominal first fixed gear is replaced by the continuously variable state (EVT) in this embodiment. The hybrid transmission 20 operates in a reverse continuously variable state (REVT) by applying clutch C1 15 with the engine 10 in the engine-on state, i.e., fueled and spinning.

The hybrid transmission 20 operates in one of the fixed gear states 2, 3, 4, 5, and 6 by selectively applying two of the clutches C1 25, C2 35, C3 45, and C4 55 with the engine 10 fueled and spinning. Each of the fixed gear states can include the torque machine power assist mode wherein the torque machine 70 is operated to transfer torque to the hybrid transmission 20. Each of the fixed gear states can include the torque machine power assist mode wherein the torque machine 70 operates to generate storable power from engine torque input to the hybrid transmission 20.

The hybrid transmission 20 preferably operates in the regenerative power braking mode by operating in the torque machine state and operating the torque machine 70 to generate reactive power that is converted to storable power by reacting vehicle kinetic energy input to the hybrid transmission 20 via the driveline 80. The regenerative power braking mode preferably includes operating with the engine 10 unfueled and spinning.

The hybrid transmission 20 operates in a charging state to charge the energy storage device, including transferring torque from the input member to the torque machine 70 with all of the clutch devices are deactivated. The torque machine 70 converts the torque to potential energy that is stored in the energy storage device.

Figure 3:
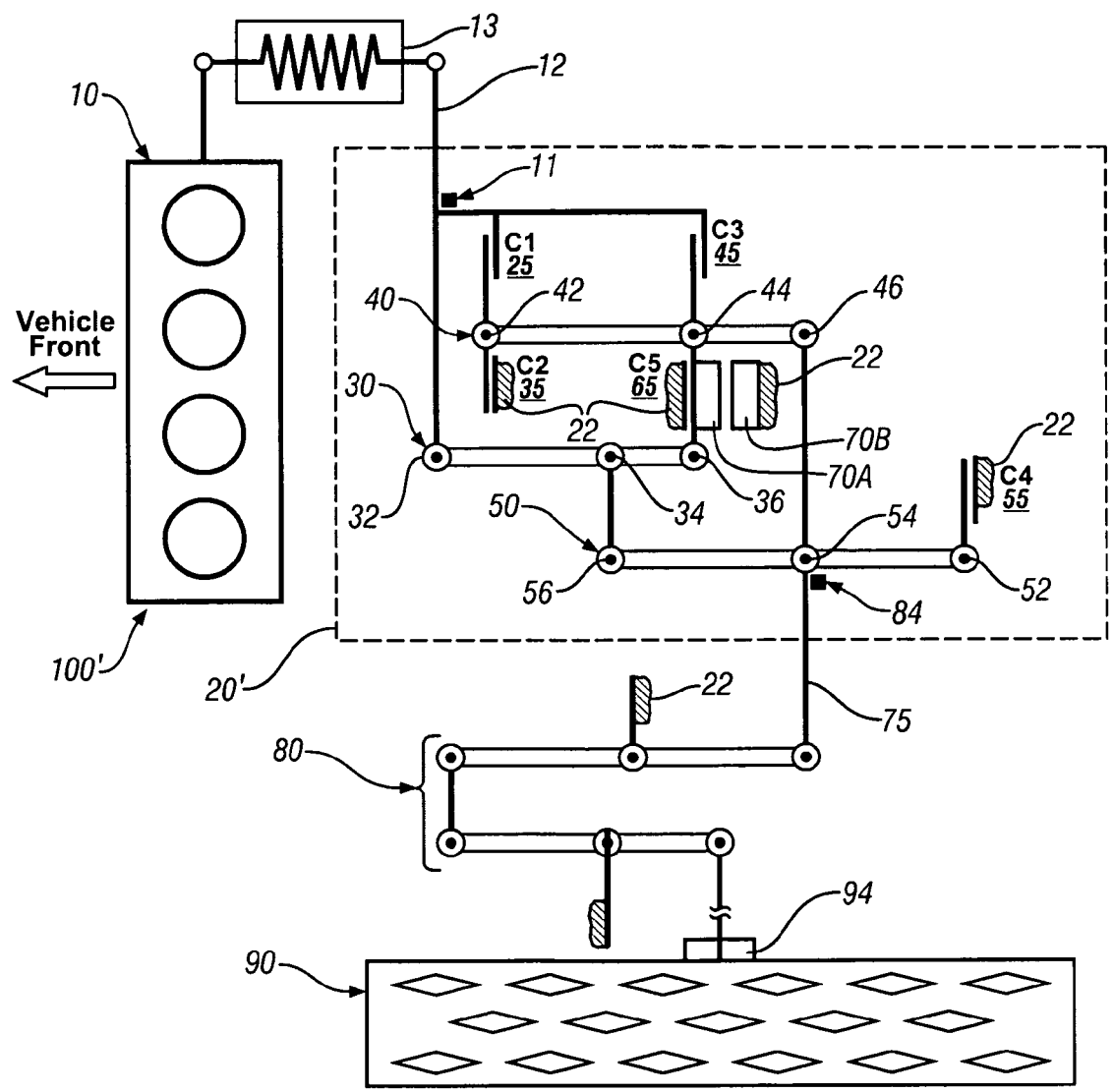

FIG. 3 schematically shows a second embodiment of the powertrain system 100' including hybrid transmission 20'. The hybrid transmission 20' includes the elements described hereinabove with reference to FIG. 1. In addition, the hybrid transmission 20' includes a fifth clutch C5 65 that grounds the rotor 70A of the torque machine 70 to the ground 22 when applied. This configuration enables the addition of Reverse in a fixed gear state and a first fixed gear state.

FIG. 4 shows exemplary operating states (Gear State) and associated gear ratios (Gear Ratio) for the hybrid transmission 20' and powertrain system depicted in FIG. 3 in chart form. The table of FIG. 4 depicts applied ones (X) of the clutches C1, C2, C3, C4, and C5 to achieve specific transmission states including Reverse (REVT), Neutral (N), continuously variable state (EVT), each of the fixed gear states (Rev, $1^{st}$, 2nd, 3rd, 4th, 5th, and 6th), and the torque machine state (EV) wherein the engine 10 is in the engine-off state.

In this embodiment, vehicle launch is preferably initially achieved by operating in the continuously variable state. The launch can occur in either a forward or reverse direction. Rotational speed of the torque machine 70 can be reduced to at or near zero, with clutch C5 65 subsequently applied. Applying clutch C5 65 stops rotation of the torque machine 70. The hybrid transmission 20 then operates in one of the first fixed gear or reverse. As previously described, the continuously variable state (EVT) includes operating the torque machine 70 and the engine 10 to generate power with a single applied clutch, e.g., C4 55 in the embodiment, to transfer torque and power through the hybrid transmission 20 to the driveline 80 to launch the vehicle or permit creep. The Reverse state is achieved by operating the torque machine 70 and the engine 10 to generate power with only clutch C1 25 applied.

Figure 5:
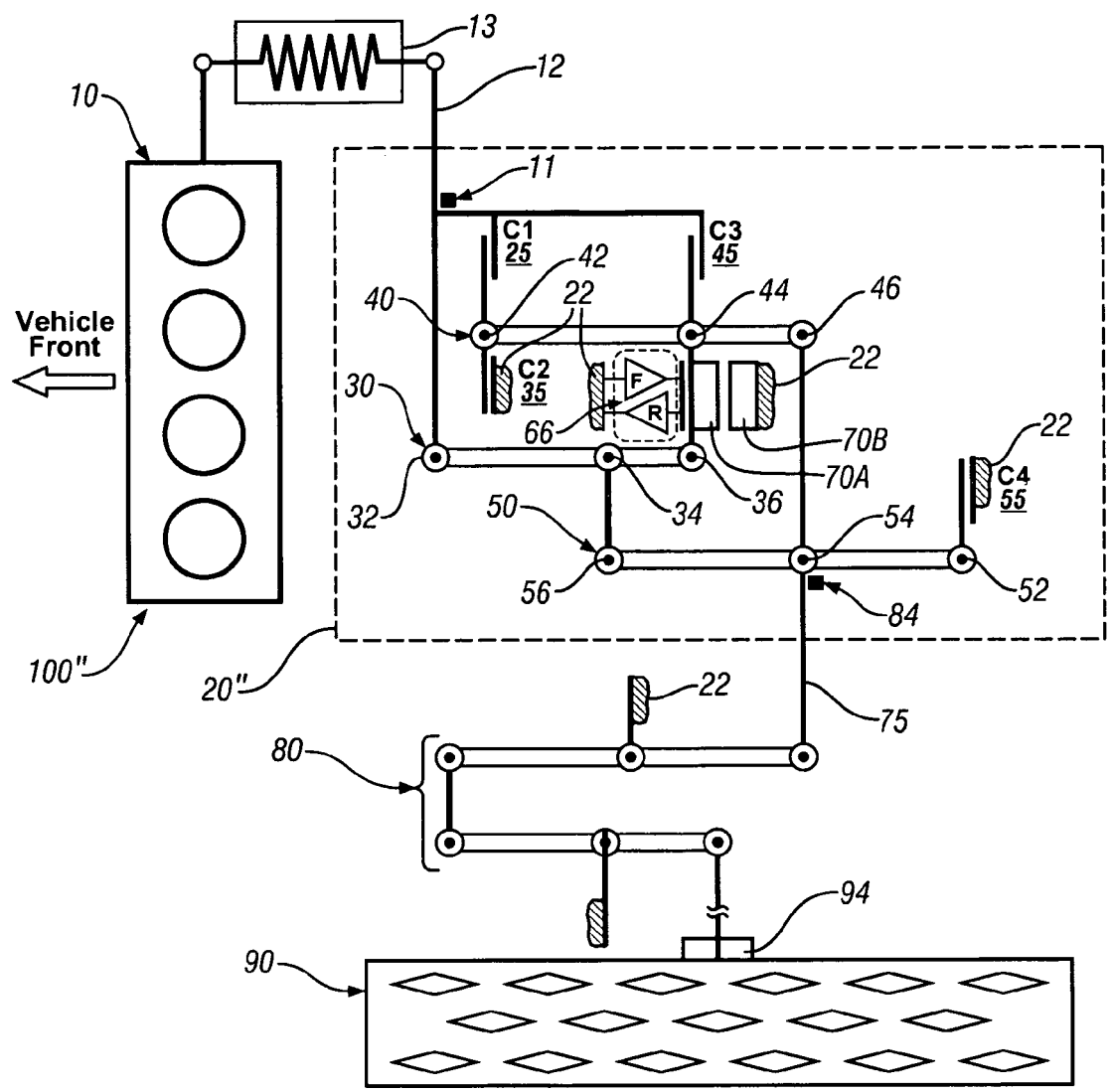

FIG. 5 schematically shows a third embodiment of the hybrid powertrain 100" including hybrid transmission 20". The hybrid transmission 20" includes the elements described hereinabove with reference to FIG. 1. In addition, the hybrid transmission 20" includes a fifth clutch comprising a two-way selectable one-way clutch 66 controllable in a forward (F) direction and in a reverse (R) direction. The two-way selectable one-way clutch 66 connects between the torque machine 70 and the sun member 32 of the first planetary gearset 30. The two-way selectable one-way clutch (SOWC) 66 enables the hybrid transmission 20" to operate in Reverse in a fixed gear state and operate in a first forward fixed gear state.

FIG. 6 shows exemplary operating states (Gear State) and associated gear ratios (Gear Ratio) for the hybrid transmission 20" and powertrain system depicted in FIG. 5 in chart form. The table of FIG. 6 depicts applied ones (X) of the clutches C1, C2, C3, C4, and SOWC to achieve specific transmission states including a continuously variable Reverse state (REVT), Neutral (N), a continuously variable state (EVT), each of the fixed gear states (Rev, $1^{st}$, 2nd, 3rd, 4th, 5th, and 6th), and torque machine state (EV) wherein the engine 10 is in the engine-off state.

In this embodiment, vehicle launch is preferably initially achieved by operating in the continuously variable state (EVT). Once launch occurs in either a forward or reverse direction, speed of the torque machine 70 can be reduced to at or near zero. The two-way selectable one-way clutch (SOWC) 66 can be applied in either the forward position (F) or the reverse position (R). The two-way selectable one-way clutch 66 can be applied to stop rotation of the torque machine 70. The hybrid transmission 20 then transitions to operate in one of the first fixed gear and reverse. As previously described, the continuously variable operating mode (EVT) includes operating the torque machine 70 and the engine 10 to generate power with a single applied clutch, e.g., C4 55 in the embodiment, to transfer torque and power through the hybrid transmission 20 to the driveline 80 to launch the vehicle or permit creep. The reverse continuously variable operating mode (REVT) is achieved by operating the torque machine 70 and the engine 10 to generate power with only clutch C1 25 applied.

Figure 7:
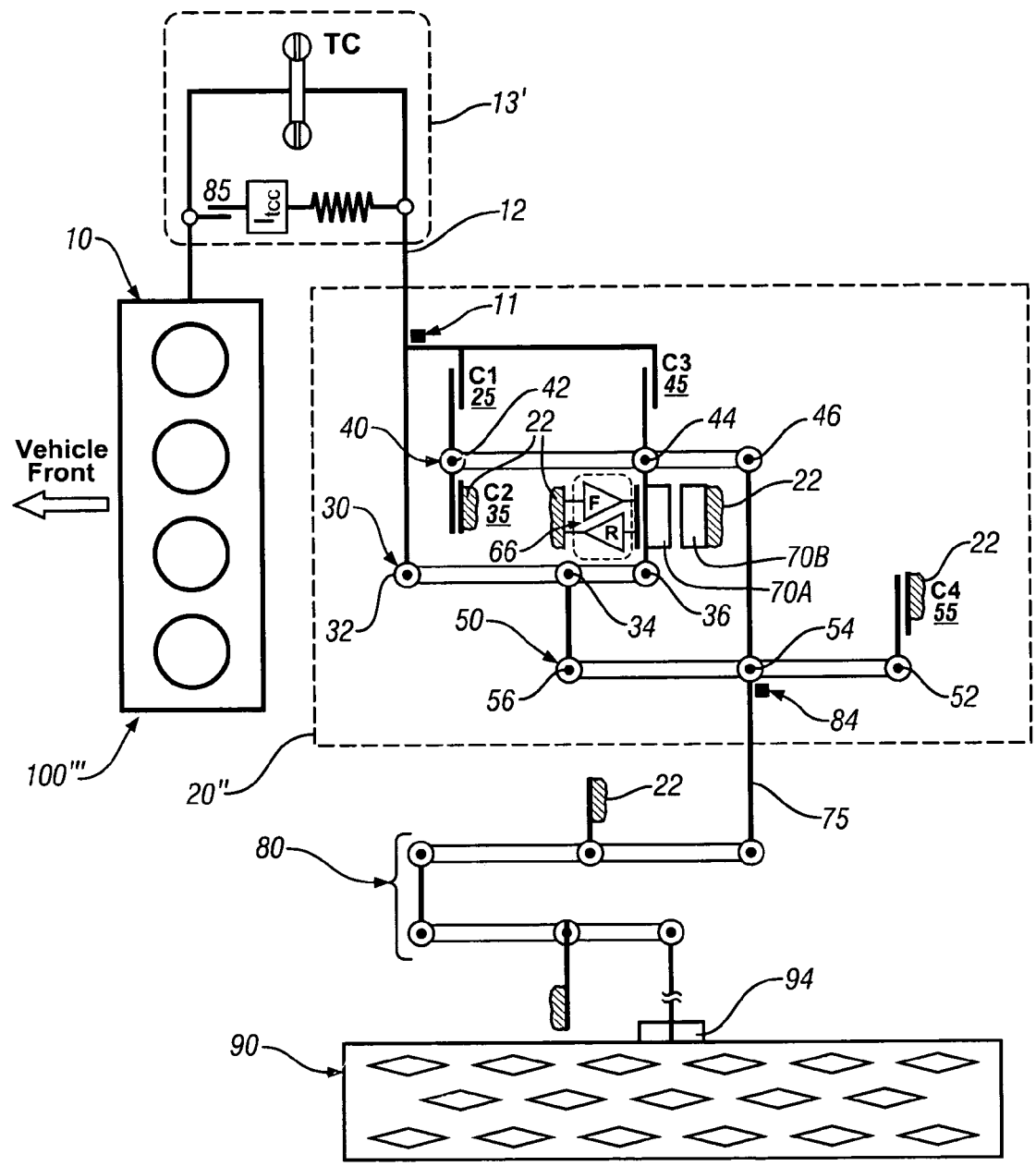

FIG. 7 schematically shows a fourth embodiment of the hybrid powertrain 100''' including hybrid transmission 20'', as previously described. An isolation device comprising a torque converter device 13' is inserted between the engine 10 and the input member 12 to the hybrid transmission 20''. The hybrid transmission 20'' includes the elements described hereinabove with reference to FIG. 1. In addition, the hybrid transmission 20'' includes the fifth clutch comprising the two-way selectable one-way clutch 66 controllable in a forward (F) direction and in a reverse (R) direction. The two-way selectable one-way clutch 66 connects between the torque machine 70 and the sun gear 32 of the first planetary gearset 30. The two-way selectable one-way clutch 66 adds Reverse in a fixed gear state and a first forward fixed gear state. The torque converter device 13' includes a torque converter clutch 85. When the powertrain is operating with the engine 10 on and the torque converter clutch 85 is open, i.e., not applied, vehicle launch can be achieved in the first fixed gear state.

FIG. 8 shows exemplary operating states (Gear State) and associated gear ratios (Gear Ratio) for the hybrid transmission 20'' and powertrain system 100''' depicted in FIG. 7 in chart form. The table of FIG. 8 depicts applied ones (X) of the clutches C1, C2, C3, C4, and SOWC to achieve specific transmission states including Reverse (REVT), Neutral (N), continuously variable state (EVT), each of the fixed gear states (Rev, 1$^{st}$, 2nd, 3rd, 4th, 5th, and 6th), and the torque machine state (EV) wherein the engine 10 is in the engine-off state. In this embodiment, vehicle launch can be initially achieved by operating in the first fixed gear state or in the reverse state. The torque machine 70 can be used to assist in the vehicle launch or can be stopped using the two-way selectable one-way clutch 66.

Figure 9:
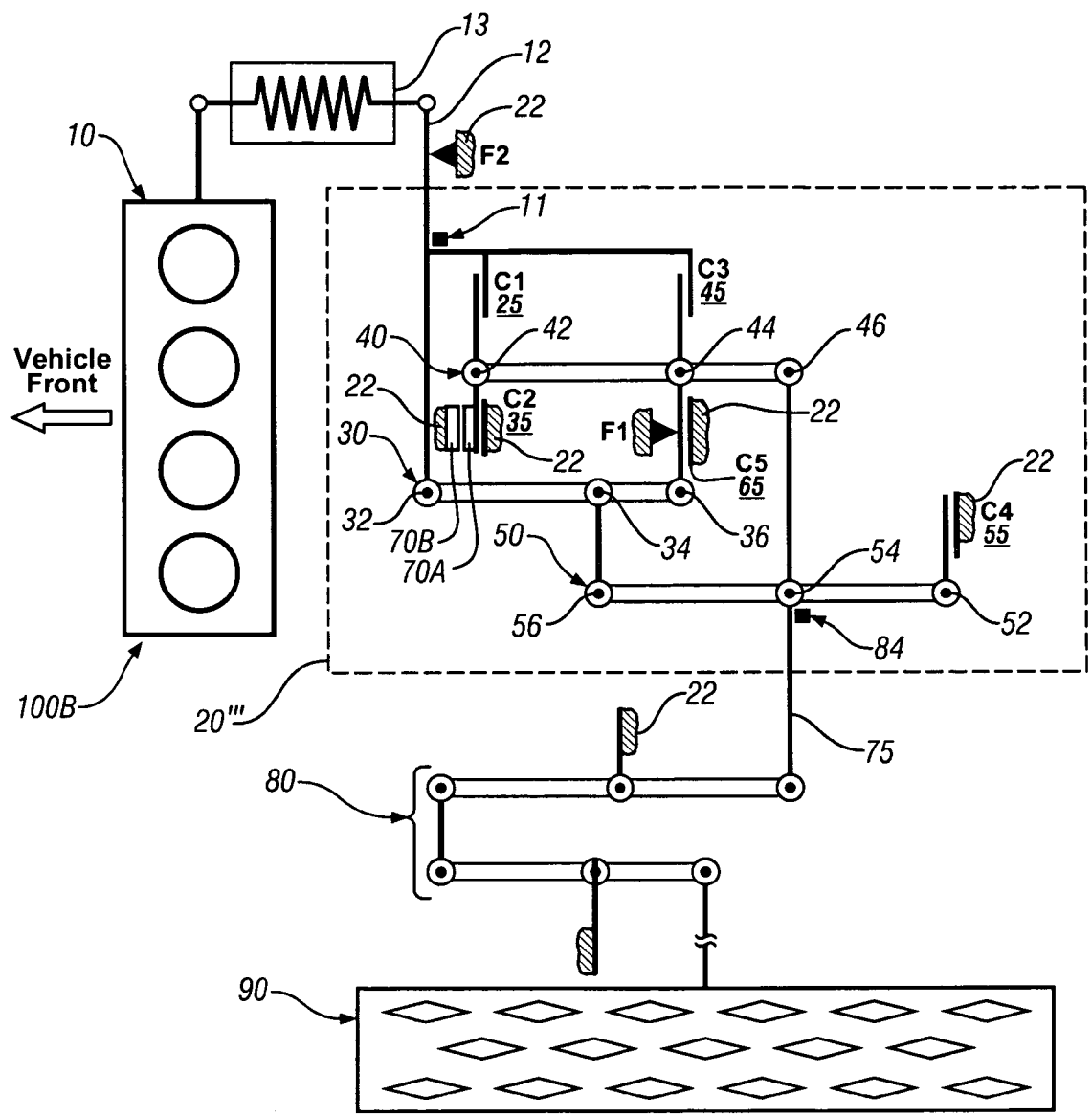
FIG. 9 is a schematic diagram of an exemplary hybrid powertrain, in accordance with the present disclosure.

FIG. 9 schematically shows a fifth embodiment of the hybrid powertrain 100B including hybrid transmission 20'''. The hybrid transmission 20''' includes the elements described hereinabove with reference to FIG. 1. In addition, the hybrid transmission 20''' includes the fifth clutch C5 65 that grounds rotation of the second planet carrier assembly 44 and the input ring gear member 36 when applied. A selectable one-way clutch (OWC) FI can be applied to prevent spinning the second planet carrier assembly 44 and the input ring gear member 36 in one direction when applied. In this embodiment, the torque machine 70 is coupled via clutch C2 35 to the sun gear member 42 of the second planetary gearset 40. Selectable one-way clutch F2 can be applied to prevent spinning the engine 10 in the reverse direction during operation in the torque machine state.

FIG. 10 shows exemplary operating states (Gear State) and associated gear ratios (Gear Ratio) for the hybrid transmission 20''' and powertrain system 100B depicted in FIG. 9 in chart form. The table of FIG. 10 depicts applied ones (X) of the clutches C1, C2, C3, C4, C5 and OWC to achieve specific transmission states including a forward continuously variable state (EVT) and a reverse continuously variable state (REVT), Neutral (N), each of the fixed gear states (Rev, 1$^{st}$, 2nd, 3rd, 4th, 5th, and 6th), and the torque machine state (EV) wherein the engine 10 is in the engine-off state. In this embodiment, vehicle launch can be achieved by operating in either of the forward and reverse continuously variable states. Once vehicle launch is achieved, the motor speed of the torque machine 70 can be reduced to at or near zero RPM. Clutch C5 65 can be applied to effect operation in one of the first fixed gear (1$^{st}$) and Reverse (Rev). When clutch C5 65 is applied, power flow to the torque machine 70 is discontinued. The selectable one-way clutch F2 is applied to prevent spinning the engine 10 in the reverse direction (Lock-up) during operation in the torque machine state (EV).

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. A transmission device, comprising:
    an input member coupled to a first element of an input differential gearset;
    a second element of the input differential gearset coupled to a third element of an output differential gearset;
    a third element of the input differential gearset coupled to a second element of a reactive differential gearset;
    a torque machine including a rotor and a stator;
    the rotor of the torque machine rotatably coupled to the third element of the input differential gearset and the second element of the reactive differential gearset;
    an output member coupled to a second element of the output differential gearset and coupled to a third element of the reactive gearset;
    a first clutch device configured to selectively couple rotation of the input member to rotation of a first element of the reactive differential gearset;
    a second clutch device configured to selectively ground rotation of the first element of the reactive differential gearset;
    a third clutch device configured to selectively couple rotation of the input member to rotation of the second element of the reactive differential gearset;
    a fourth clutch device configured to selectively ground rotation of a first element of the output differential gearset;
    the transmission configured to transfer torque among the input member and the output member in one of a plurality of fixed gear states when selected pairs of the first, second, third, and fourth clutch devices are applied;
    the transmission configured to transfer torque between the input member, the torque machine, and the output member in a continuously variable state when only the fourth clutch device is applied;
    the transmission configured to transfer torque between the torque machine and the output member in a torque machine state when the first and second clutch devices are applied; and the transmission configured to transfer torque between the torque machine and the input member in an energy storage device charging state when all of the clutch devices are deactivated.

2. The transmission device of claim 1, further comprising the transmission device configured to execute a launch maneuver by transferring torque among the input member, the torque machine, and the output member in the continuously variable state when only the fourth clutch device is applied.

3. The transmission device of claim 1, further comprising a fifth clutch device configured to selectively ground the rotor of the torque machine and the third element of the input differential gearset.

4. The transmission device of claim 3, further comprising the transmission device configured to execute a launch maneuver in a first fixed gear state only when the fourth and fifth clutch devices are applied.

5. The transmission device of claim 3, wherein the fifth clutch device comprises a two-way selectable one-way clutch device.

6. The transmission device of claim 5, further comprising the transmission device configured to execute a launch maneuver in a forward fixed gear state only when the fourth clutch device is applied and the two-way selectable one-way clutch device is applied in a first direction.

7. The transmission device of claim 5, further comprising the transmission device configured to execute a launch maneuver in a reverse fixed gear state only when the fourth clutch device is applied and the two-way selectable one-way clutch device is applied in a second direction.

8. The transmission device of claim 1, further comprising the transmission device configured to transfer torque between the input member and the output member in one of five fixed gear states when selected pairs of the first, second, third, and fourth clutch devices are applied.

9. The transmission device of claim 3, further comprising the transmission device configured to transfer torque between the input member and the output member in one of six fixed gear states when selected pairs of the first, second, third, fourth, and fifth clutch devices are applied.

10. The transmission device of claim 1, further comprising:
the transmission device configured to transfer torque between the torque machine and the output member in the torque machine state when rotation of the input member is stopped and the first and second clutch devices are applied.

11. The transmission device of claim 1, further comprising the transmission device configured to transfer torque among the input member, the torque machine, and the output member in a torque machine-assisted fixed gear state when selected pairs of the first, second, third, and fourth clutch devices are applied.

* * * * *